(12) United States Patent
Galasso et al.

(10) Patent No.: US 8,366,130 B2
(45) Date of Patent: Feb. 5, 2013

(54) METHODS AND APPARATUS FOR SELECTIVE STIFFNESS OF VEHICLE SUSPENSION

(75) Inventors: Mario Galasso, Watsonville, CA (US); Wesley E. Allinger, Santa Cruz, CA (US)

(73) Assignee: Fox Factory, Inc., Scotts Valley, CA (US)

(*) Notice: Subject to any disclaimer, the term of this patent is extended or adjusted under 35 U.S.C. 154(b) by 511 days.

(21) Appl. No.: 12/623,788

(22) Filed: Nov. 23, 2009

(65) Prior Publication Data

US 2010/0133776 A1    Jun. 3, 2010

Related U.S. Application Data

(60) Provisional application No. 61/117,090, filed on Nov. 21, 2008, provisional application No. 61/117,466, filed on Nov. 24, 2008.

(51) Int. Cl.
*B62K 21/08* (2006.01)
(52) U.S. Cl. .................. 280/276; 280/279; 280/280
(58) Field of Classification Search .................. 280/276, 280/279, 280
See application file for complete search history.

(56) References Cited

U.S. PATENT DOCUMENTS

| | | | |
|---|---|---|---|
| 4,170,369 A | 10/1979 | Strutman | |
| 4,878,558 A | 11/1989 | Asakura | |
| 5,092,421 A * | 3/1992 | Tsurumaki et al. | 180/219 |
| 5,908,200 A | 6/1999 | Stewart | |
| 5,967,538 A * | 10/1999 | Callaluca et al. | 280/279 |
| 6,145,862 A | 11/2000 | D'Aluisio et al. | |
| 6,352,276 B1 | 3/2002 | Hill | |
| 6,520,524 B1 * | 2/2003 | Costa | 280/276 |
| 6,592,136 B2 * | 7/2003 | Becker et al. | 280/276 |
| RE38,669 E | 12/2004 | Voss et al. | |
| 6,893,037 B1 | 5/2005 | Galasso | |
| 7,425,009 B2 | 9/2008 | Namazue et al. | |

* cited by examiner

*Primary Examiner* — Tashiana Adams
*Assistant Examiner* — Marlon Arce
(74) *Attorney, Agent, or Firm* — Patterson & Sheridan, L.L.P.

(57) ABSTRACT

A method and apparatus for an adjustable suspension system for a vehicle comprises at least one strut. In one embodiment, the stanchion (or slider) is non-uniform with a major and minor circumferential stiffness and is adjustable relative to a fore and aft axis of the vehicle in order to provide a differing amount of stiffness relative thereto. In another embodiment, a portion of the stanchion is circular and a reinforcement is annularly disposed therearound with axial retention formations, The reinforcement has a non-uniform circumferential characteristic and is rotatable relative to the fore/aft axis of the vehicle.

12 Claims, 6 Drawing Sheets

FIG. 5A
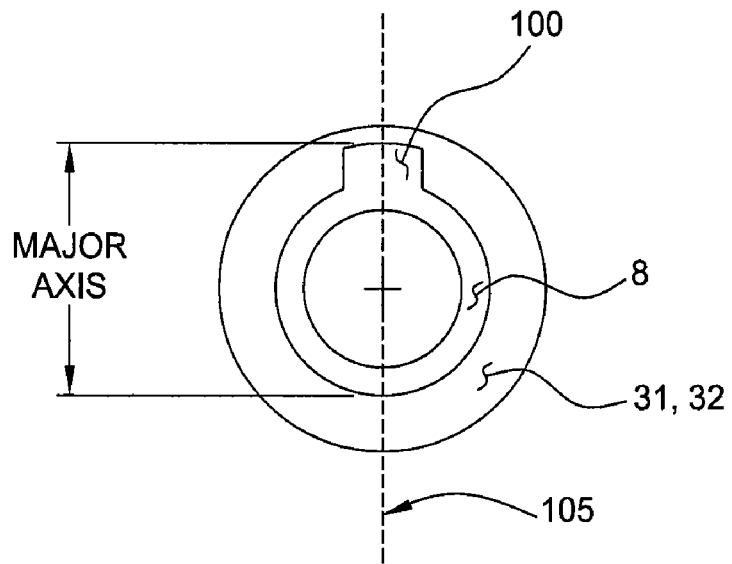
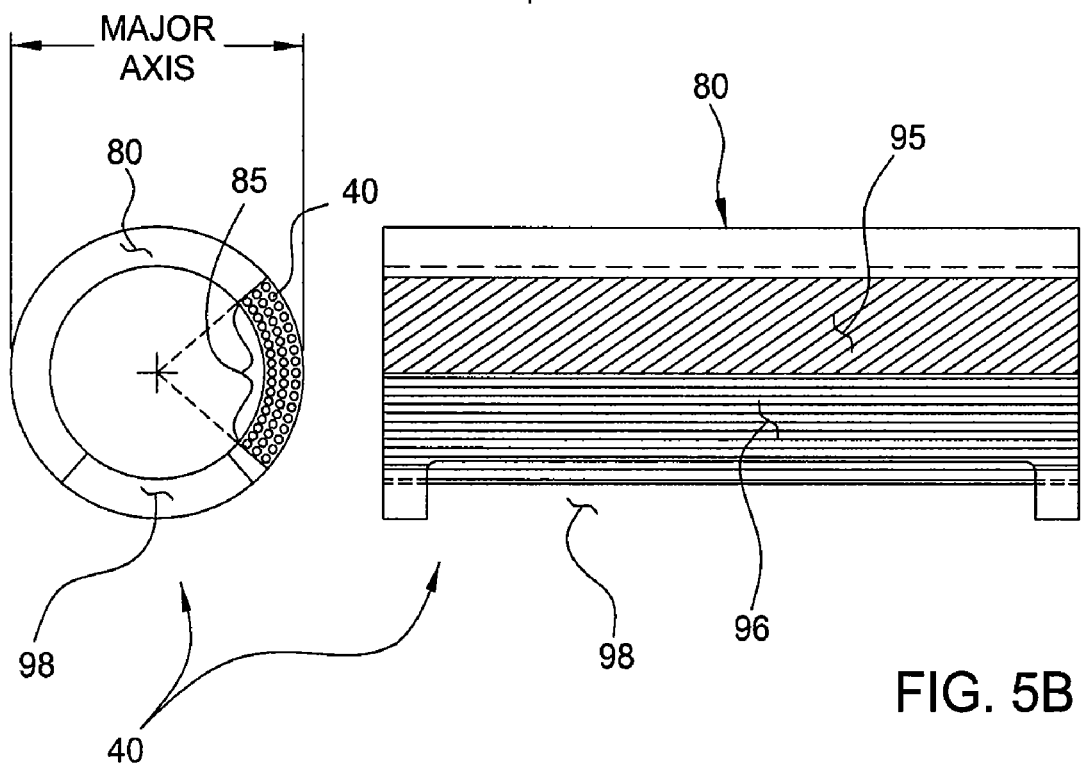
FIG. 5B
FIG. 5C

FIG. 6A
FIG. 7A
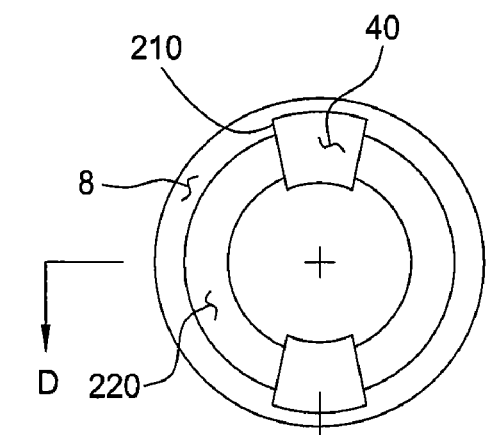
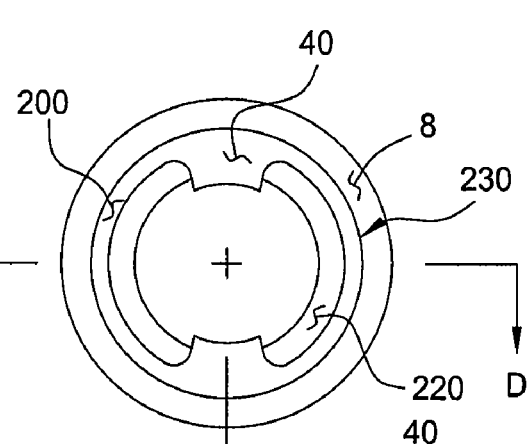
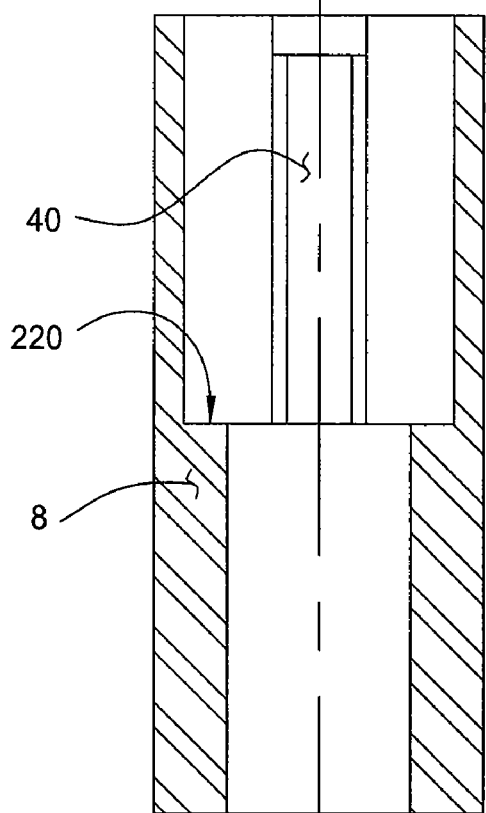
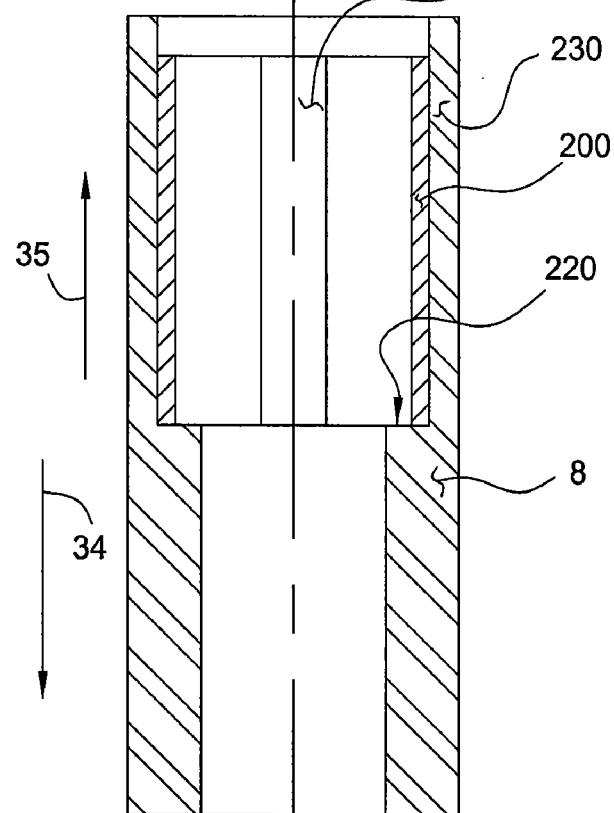
FIG. 6
FIG. 7

METHODS AND APPARATUS FOR SELECTIVE STIFFNESS OF VEHICLE SUSPENSION

CROSS-REFERENCE TO RELATED APPLICATIONS

This application claims benefit of U.S. provisional patent application Ser. No. 61/117,090, filed Nov. 21, 2008, and U.S. provisional patent application Ser. No. 61/117,466, filed Nov. 24, 2008, which applications are herein incorporated by reference.

BACKGROUND OF THE INVENTION

1. Field of the Invention

Embodiments of the invention generally relate to methods and apparatus for use in vehicle suspension. Particular embodiments of the invention relate to methods and apparatus useful for structural reinforcement of suspension components.

2. Description of the Related Art

There are many types of vehicles that use suspension components for absorbing and dissipating energy imparted to the vehicle by the terrain over which the vehicle travels. Bicycles and motorcycles, particularly those designed for off road use, are used herein as examples of vehicles. The front fork of a bicycle or motorcycle most often includes the front suspension component of that vehicle.

Among riders and users (e.g., tuners, mechanics, designers) there is no consensus on fork chassis stiffness (resistance to flexing) requirements for off road motorcycles. Supercross (i.e., stadium style motocross) courses are generally smoother and are packed with manmade obstacles requiring precision and timing to negotiate them properly. The precision needed in supercross leads the riders to choose stiffer, more precise steering fork chassis. Professional supercross riders might, for example, prefer large diameter forks for supercross races. Outdoor motocross is generally very fast with a mix of man made and natural terrain obstacles. Outdoor motocross courses can get very rough. Professional outdoor motocross riders might, for example, prefer smaller diameter, less rigid, fork chassis to allow some compliance through flex of the front fork system. Top level youth riders also differ amongst themselves on fork chassis stiffness. Larger and more aggressive riders may look for more rigid fork systems. Lighter, smoother riders may prefer some flex in their fork system to provide more compliance.

Vehicle suspension systems typically include structures that must resist forces tending to bend and/or twist those structures. That means that the structures need to be designed structurally to properly handle anticipated loads. In many applications it would, however, be desirable to selectively adjust the reinforcement of the suspension to suit the needs of a particular user, the characteristics of the terrain to be traversed or both. What is needed is a structural reinforcement for a suspension component that is capable of being adjusted or "tuned" by a user between configurations offering more reinforcement in a chosen direction and configurations offering less reinforcement in a chosen direction as desired.

SUMMARY OF THE INVENTION

A method and apparatus for an adjustable suspension system for a vehicle comprises at least one stanchion for receiving a slider. In one embodiment, the stanchion or slider is non-uniform with a "major" stiffness and a "minor" stiffness axis and is adjustable relative to an up and down axis of the vehicle in order to provide a differing amount of suspension stiffness. In another embodiment, a portion of the stanchion is circular and a substantially longitudinal reinforcement portion is annularly disposed therein or around, or partially therein or around with axial retention structures, The reinforcement is non-uniform circumferentially and is movable relative to an up-down axis of the vehicle.

BRIEF DESCRIPTION OF THE DRAWINGS

So that the manner in which the above recited features can be understood in detail, a more particular description of that, briefly summarized above, may be had by reference to embodiments, some of which are illustrated in the appended drawings. It is to be noted, however, that the appended drawings only illustrate embodiments of this invention and are therefore not to be considered limiting of its scope, for the invention may admit to other equally effective embodiments.

FIG. 5A is a top view showing an alternative embodiment of a non-circular or non-round cross section of a stanchion.

FIG. 5B is a side view of a reinforcement having a substantially uniform wall thickness with a non-uniform modulus or stiffness distribution circumferentially and FIG. 5C is a top view thereof.

FIG. 6 is a side view showing a reinforcement bar that engages an inner surface of a stanchion and FIG. 6A is a top view thereof.

FIG. 7 is a side view showing a reinforcement ring having reinforcement lobes disposed within a stanchion and FIG. 7A is a top view thereof.

Figure 1:
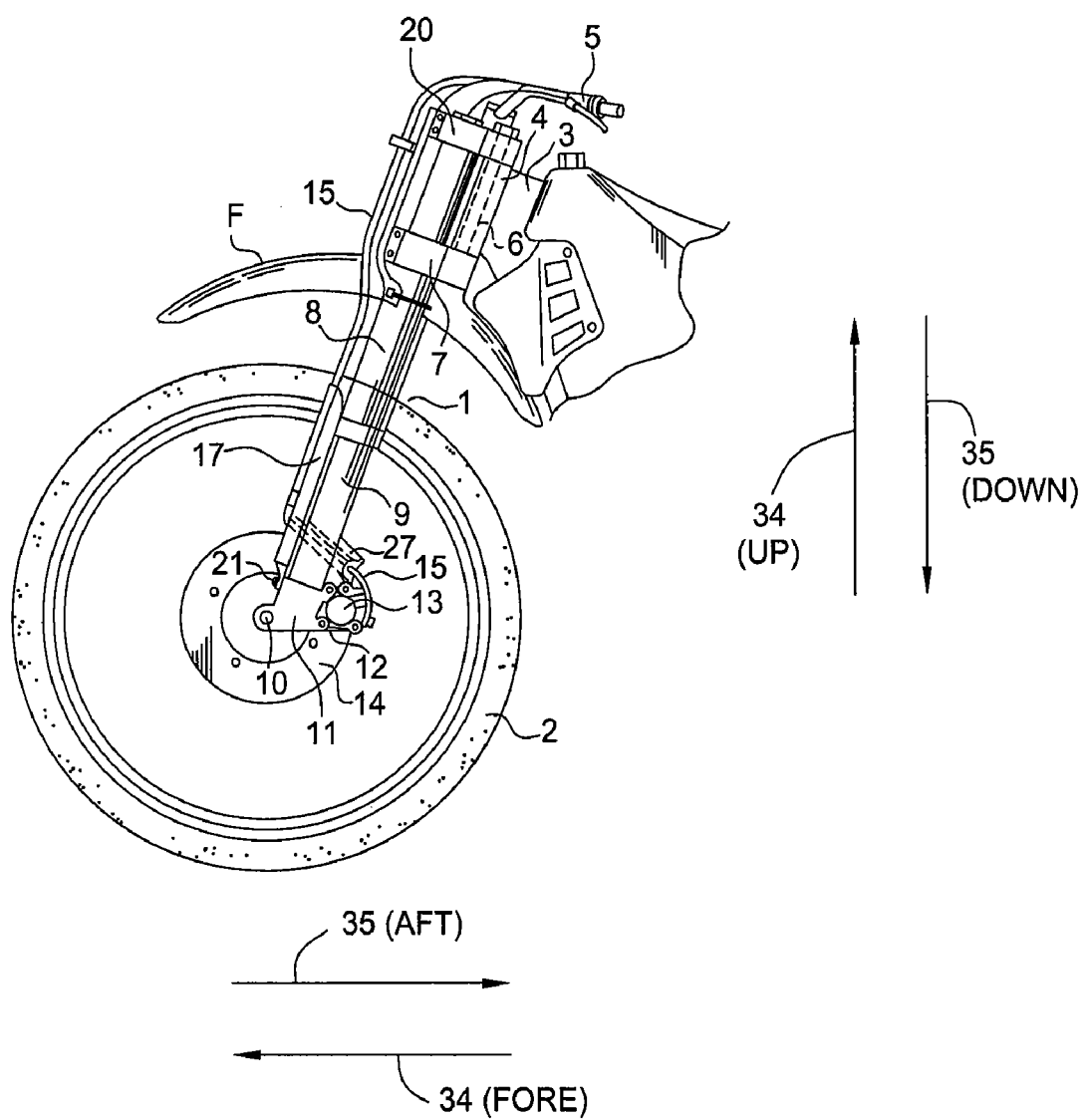
FIG. 1 is a side view of a motorcycle showing a front suspension system.

Some embodiments disclosed herein provide a fork chassis that is tunable for stiffness. One aspect of stiffness where selective tuning is advantageous is front (fore) to back (aft) and up to down (e.g., fore and aft in FIG. 2A as directions 34, 35 respectively, and up and down directions in FIG. 1 and others as 34, 35 respectively) bending, or "beam," stiffness. A modern motocross fork is made up of 5 primary structural, or chassis, elements.

1. the lower/inner tube set (right and left sides of front wheel) commonly referred to as the sliders
2. the upper/outer tube set (telescopically engaged with the sliders) commonly referred to as the stanchions
3. the lower triple clamp
4. the upper triple clamp
5. the steering tube While the examples herein may often be described in reference to motorcycle or bicycle forks, the elements disclosed herein are suitable for use on a wide variety of vehicles and respective suspension systems.

Referring also to a fork as shown in U.S. Pat. No. 4,878, 558, the main structural element defining the front to back stiffness in the above described motocross front fork is the stanchion tube set (note would be the slider tube set in an inverse fork set up). The region with the biggest affect on front to back (e.g., FIGS. 2A and 4C-34, 35) stiffness is the region below, through, and / or above the lower triple clamp (the "critical region"). It is noteworthy that some forks are essentially inverted from the above description in that the sliders are held within the triple clamp and the stanchions telescopically mounted below the sliders and thereby straddle the front wheel and engage with the front axle. The elements disclosed herein are equally suitable for use on either of the aforementioned fork configurations as well as other suspension configurations.

U.S. Pat. No. 4,878,558, assigned to Honda Giken Kogyo Kabushiki Kaisha and incorporated herein by reference in its entirety, describes an embodiment of a motorcycle fork and corresponding damage prevention covers for the inner tubes 9. That patent describes (and FIG. 1 herein shows by corresponding numbers) the stanchions as "outer cases 8" and the sliders as "inner tubes 9." That Patent further describes the upper and lower triple clamps as "upper and lower brackets respectively as 7 (or 20 FIG. 1 herein), 7." It also refers to the steering tube as a "steering handle rotary shaft 6."

Figure 3:
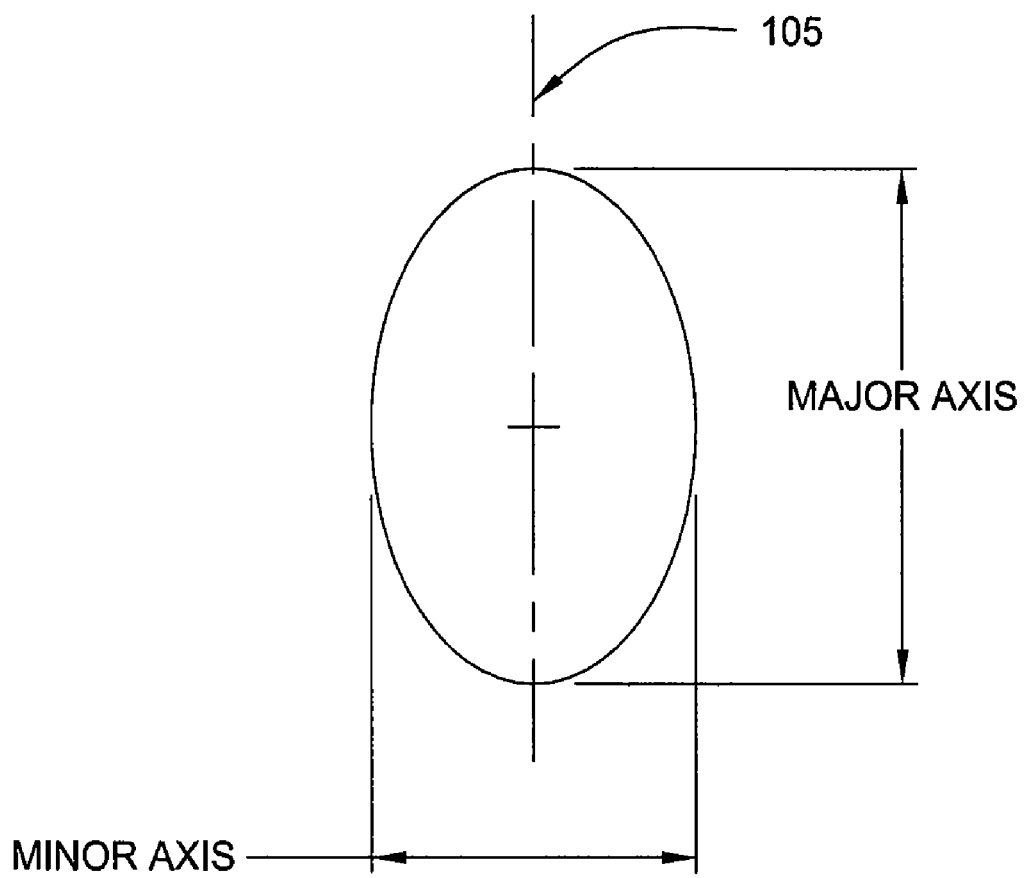
FIG. 3 is a drawing illustrating a major and minor axis of an elliptical shape.

U.S. Pat. No. 7,425,009, assigned to Showa Corporation and incorporated herein by reference in its entirety, describes the upper and lower triple clamp as the "upper bracket 15" and the "under bracket 16" respectively. It refers to the steering tube as the "steering shaft (not shown)." The stanchions are referred to as "outer tubes 13 and 13'" and the sliders are referred to as "inner tubes 14 and 14'." The Showa patent describes disc brake forces generated (directions shown in FIG. 3) on the disc side of the fork that are asymmetric in relation to the right and left sides of the fork. The Showa patent proposes a uniform increased thickness of the inner tube 14' of the disc side fork to increase stiffness of the brake side fork leg.

Other patents have dealt in various ways with various aspects of increased fork stiffness. U.S. Pat. No. 6,352,276, assigned to Marzocchi, USA, Inc. and incorporated herein by reference in its entirety, refers to a steering tube as a "stem tube 14", a lower triple clamp as a "crown 12" and a pair of "struts 16" corresponding to stanchions (because the '276 patent does not include suspension there are only stanchions and no sliders).

U.S. Pat. No. RE38,669 having inventors Darrell Voss and Gary Klein and being incorporated herein by reference in its entirety, refers to the lower triple clamp as "crown 6-3" and "stanchion tube 8-1 L." U.S. Pat. No. 5,908,200, assigned to Answer Products Inc. and incorporated herein by reference in its entirety, refers to the steering tube as "steering tube 12," lower triple clamp as "crown 14," stanchions as "lower tube 24" and the sliders as "upper tube 26." Noteworthy in the preceding two patents is that while bicycle forks may include an upper and lower triple clamp, they often include only the lower clamp or "crown."

U.S. Pat. No. 6,893,037, having inventor Mario Galasso and incorporated herein by reference in its entirety, refers to "steer tube 4," "crown 5," "stanchions 6" and "slider 10" as the respective parts of the fork.

It is noted that, regarding vehicles that employ fork type front suspension; while mounting stanchions to the steering head is quite common particularly on motorcycles, certain types of vehicles still use forks having sliders mounted to the steering head with the stanchions attached to the suspended wheel. The fork reinforcement embodiments disclosed herein are equally well suited for use with stanchions or sliders as mounted to a vehicle steering head. Reference herein to stanchions or sliders is for illustrative purposes only. Also noteworthy is that some suspension "forks" are asymmetrical and comprise only one stanchion/slider set, held by one triple clamp set and traversing only one side of a suspended wheel. The embodiments herein a well suited for use on only one stanchion/slider pair. Further, embodiments herein are suitable for use with vehicle forks having no stanchion/slider pairing such as that shown in U.S. Pat. No. 6,145,862, which patent is incorporated herein, in its entirety, by reference. That '862 patent includes a bicycle fork, that while suspended in a head tube arrangement, comprises no moving parts in the fork struts. Embodiments disclosed herein may nonetheless be useful in selectively stiffening or reducing stiffness in single piece forks. Additionally, as shown in U.S. Pat. No. 4,170,369, which patent is incorporated herein, in its entirety, by reference, a "fork" need not comprise more than a single strut (noting that each of a stanchion and a slider is a "strut" and together the form a telescopic "strut" or strut assembly). Embodiments herein may nonetheless be used in conjunction with such single strut type forks whether the single strut includes a suspension component or not.

Figure 2A:
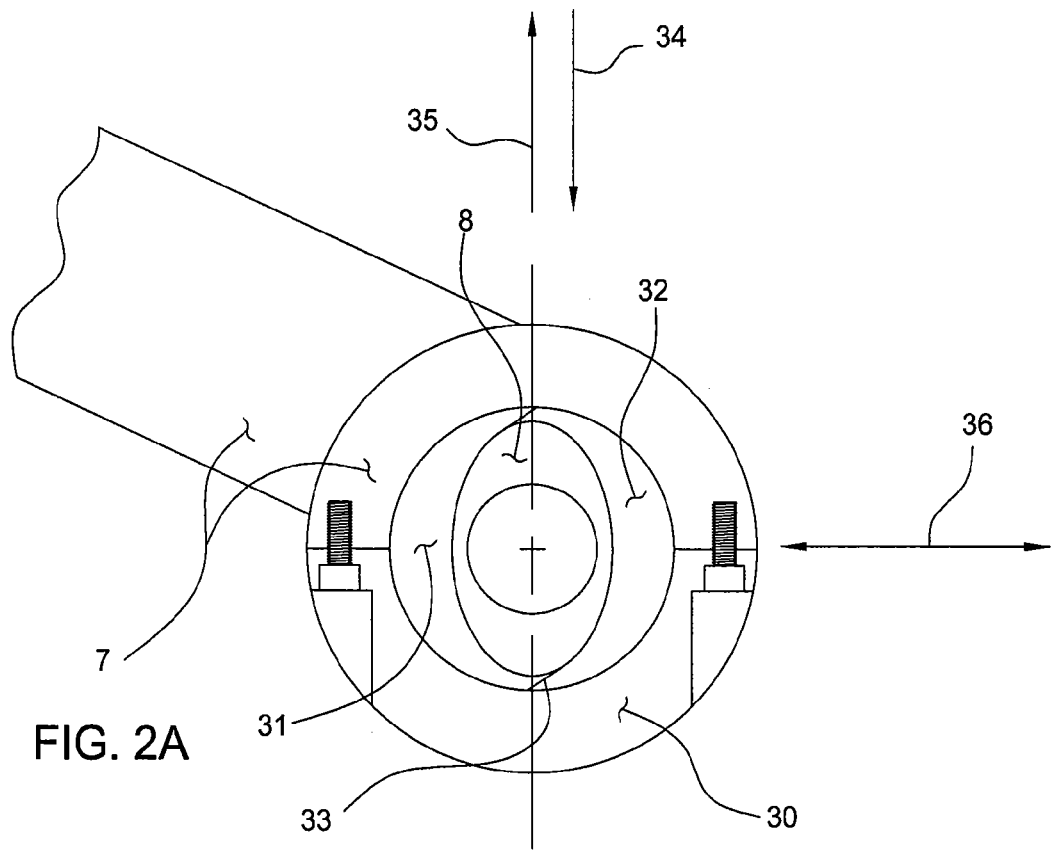
FIG. 2A is a sectional top view of FIG. 2, taken through a line 2A-2A.
Figure 2:
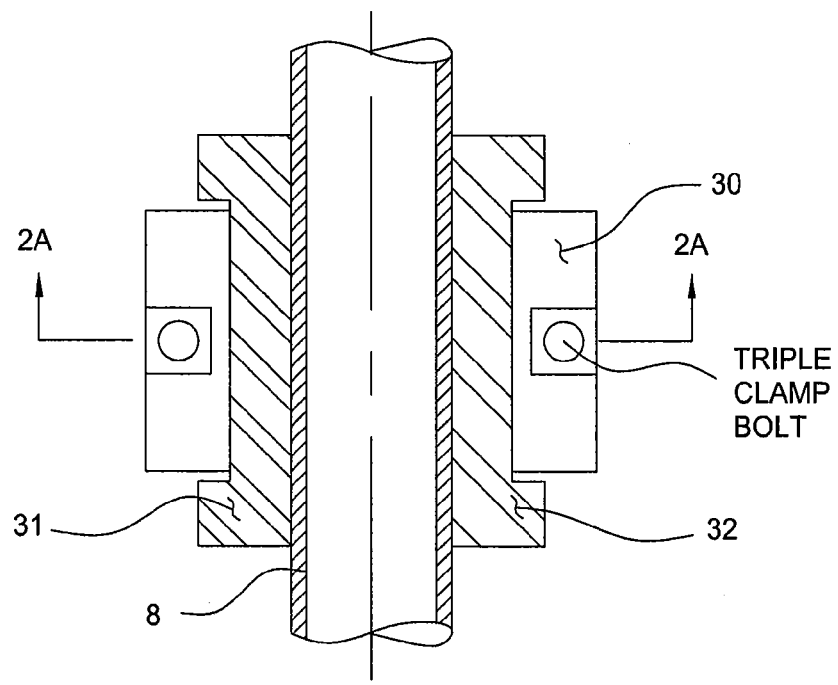
FIG. 2 is a section view showing one embodiment.

In one embodiment, shown in FIG. 1 of the present application, the stanchions 8 are held in the lower triple clamp 7 and the upper triple clamp 20. Referring to FIGS. 2 and 2A, while the inner diameter of the stanchions 8 is circular, at least a portion of the length of the stanchions has an elliptical outer surface. As shown in FIG. 2A the stanchion 8 is positioned in relation to lower triple clamp 7 such that the major elliptical axis (refer to FIG. 3) of the stanchion 8 is substantially aligned with the forward 34 and aft 35 directions of the bicycle or motorcycle. The lower triple clamp parts 7 and 30 engage to form a substantially circular clamped region. The split bushing 31, 32 adapts the elliptical outer surface of the stanchion 8 to be clamped by the circular inner surface of lower triple clamp 7. The split bushing 31, 32 is scarf cut 33 in two places (or cut in any other suitable manner) at approximately 180 degrees. That allows the split bushing 31,32 to tightly transfer clamping force from the triple clamp 7 to the stanchion 8 by mitigating substantial part tolerance issues that might otherwise interfere. In one embodiment the bushing comprises a substantially incompressible elastic material (e.g. rubber, urethane) and will transfer clamping force there though by means of an iso-static pressure created therein by the clamping force (based on bulk modulus of the material). As such a scarf cut is not always necessary. With the stanchion 8 and split bushing 31, 32 in place, the triple clamp 7, 30 is tightened by means of the triple clamp bolts as shown.

In one embodiment the cross section for the stanchion tube 8 in the critical region is non round. One example of a suitable non-circular or non-round cross section is shown in FIG. 5A. The stanchion 8 includes a "lobe" or beam web 100 (running axially along a length of the stanchion but not shown) which enhances axial bending stiffness of the stanchion 8 along plane 105 (plane 105 shown as line 105 and extending into and out of the page). The lobe may be any suitable cross sectional shape and may be located circumferentially at a single zone or the stanchion may comprise a plurality of lobes located for example at 180 degrees or other suitable locations for enhancing selected bending stiffness of the stanchion 8. For purposes of this description the non round cross section may be elliptical (referring to FIG. 3) although practically it may be any other suitable cross section (i.e., consistent with selective reinforcement). The raw material for the stanchion 8 may be a tube with round ID and elliptical OD. Below the axially, or lengthwise, lowest desired elliptical section of the tube, the tube may be machined to have a round OD in order to reduce weight where the elliptical cross section contribution is not needed. Above the upper most elliptical cross section, the tube may include a round OD, if desired, so that the interface with the upper triple clamp 20 is simpler. Referring to FIGS. 2 and 2A, a split shim 31, 32 is mounted in the lower triple clamp 7, 30. The OD of this shim 31, 32 is round. The ID of this shim 31, 32 is elliptical and fits over the elliptical OD of the stanchion tube 8. In essence, this composite cross section of stanchion 8 and shim 31, 32 results in a round OD interface with the lower triple clamp 7, 30. The round, or circular, interface helps facilitate ease of rotation (e.g. adjustment) of the stanchion relative to the clamp when altered fork stiffness characteristics are desired. When the major axis (note the term "major axis" herein refers not only to the dimensionally larger cross sectional axis but also to any axis including the plane of increased stiffness 105) of the stanchion 8 is aligned parallel to the center plane 34, 35 of the vehicle (e.g. motorcycle, bicycle), the fork will be in its' stiffest front to rear setting. That is consistent with cross sectional moment of inertia calculations and beam stiffness calculations presuming the major axis to comprise the web of a cross sectioned beam. It is noteworthy that the cross section of the stanchion may vary and include many suitable shapes or combinations thereof (e.g., rectangle, I beam web). The "web" or cross sectional extension may exist on only one side of the stanchion 8 thereby forming in one embodiment a "tear drop" shaped cross section.

In one embodiment, when stanchion 8 is rotated approximately 90 degrees relative to the triple clamp 7, 20 such that the minor axis of the stanchion 8 is aligned with the center plane 34, 35 of the motorcycle, the fork will be in its' least stiff front to rear setting. Laser etching datum marks, or other suitable marking may be provided on the lower triple clamp 7, 30 and on the outside of the stanchion 8 to allow the rider to readily line up the major or minor axes in the desired orientation (e.g., front to rear stiff or front to rear flexible corresponding with the major and minor axis alignment respectively with plane 34, 35). As is shown the triple clamp 7, 30 and 20 may be loosened and the rider/user can rotationally orient the major axis of the stanchion 8 in line with front rear vehicle plane 34, 35 for maximum fork stiffness or laterally 36 for maximum fork flexibility or at orientations in between for corresponding intermediate stiffness.

Figure 4B:
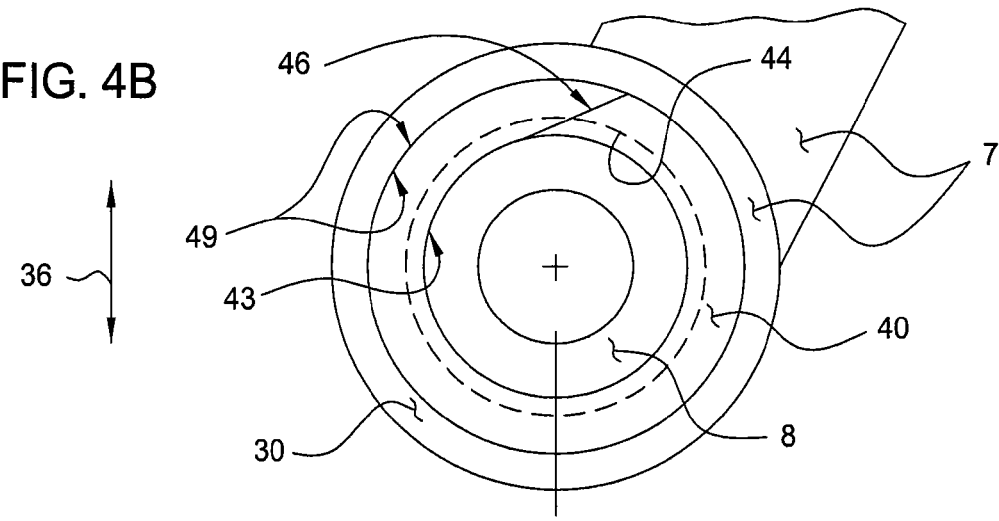
FIG. 4B is a section view of FIG. 4 taken through a line 4B-4B.
Figure 4A:
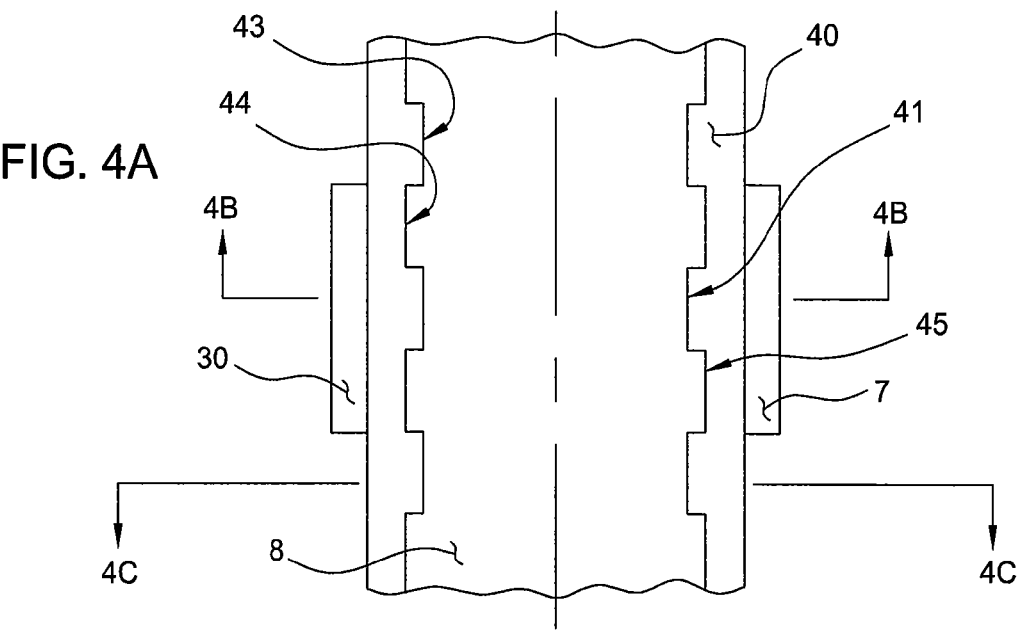
FIG. 4A is a section view showing an alternative embodiment.
Figure 4C:
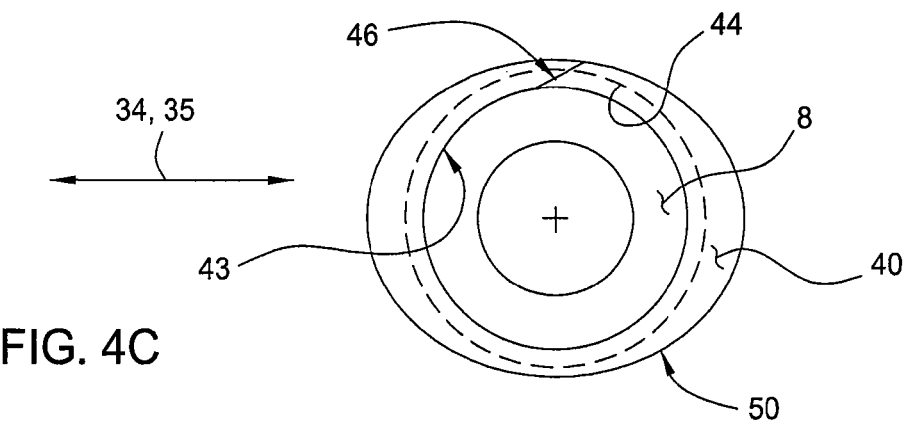
FIG. 4C is a section view taken through a line 4C-4C.

In one embodiment, and referring to FIGS. 4A-4C, stanchion 8 (or slider if inverse fork arrangement) has a circular inner diameter and a circular outer diameter. The outer diameter of stanchion 8 is scribed with grooves 41 at intervals along its length over a region of desired stanchion support. In between the grooves 41 are circumferential raised (relative to the groove depth - e.g. full stanchion OD) diameter portions 45 (optionally 41 / 45 may comprise a selected thread form). Fitted around the exterior of the stanchion 8 axially along the length of a region of desired selectable enhanced support, is reinforcement 40. For initial installation reinforcement 40 is spread, at scarf cut 46, to fit over stanchion 8. Reinforcement 40 may comprise two cuts at suitable relative angles, such as 180 degrees (in other words reinforcement 40 may comprise two pieces), thereby avoiding any need to flex the reinforcement 40 during installation. Reinforcement 40 has spaced inner grooves 44 and smaller intervening ID portions 43 that engage respectively with raised diameter portions 45 and grooves 41 of the stanchion. Once the reinforcement 40 is installed on stanchion 8 it is rotatable there about. With the triple clamp 7, 30 (and 20 if reinforcement extends that far) loose the major axis of the reinforcement can be selectively aligned with the vehicle front / rear plane 34, 35 to provide maximum fork stiffness or with lateral plane 36 to provide minimum stiffness. It may also be aligned at intermediate positions. With the reinforcement 40 in the desired orientation, the triple clamp 7, 30 is tightened around the reinforcement 40 which in turn tightens around stanchion 8 thereby retaining the stanchion and the preferred orientation of the reinforcement 40. As shown in FIG. 4B, the outer surface 49 of the reinforcement 40 is circular in the axial region within (i.e. corresponding to the length of) the triple clamp 7, 3D. As demonstrated by FIG. 4C, the reinforcement 40 has an elliptical outer surface at axial locations on either side of the triple clamp 7, 30. The inner surface 49 of the triple clamp 7, 30 is circular so as to substantially engage the circular outer surface 49 of the reinforcement 40 (within the triple clamp). The engaged circular surfaces 49 facilitate rotation of reinforcement 40 within the loosened triple clamp 7, 30 and gripping retention of reinforcement 40, by the tightened triple clamp 7, 30 in any selected relative rotational orientation between the reinforcement and the clamp. Additionally, the inner surfaces of the reinforcement 40 are substantially circular to engage the circular outer surface of the stanchion 8. The engaged grooves 41, 43 and 44, 45 provide axial lengthwise shear area thereby transferring bending forces between the stanchion 8 and the reinforcement 40 (as inter-part surface shear and hence enabling the reinforcement to aid in stiffening the stanchion). Note that other suitable axial shear transfer mechanisms may be employed such as, for example, axially spaced clamps where inter-part friction is the shear transfer mechanism or through bolts where headed bolts are disposed in holes though the reinforcement 40 and threaded into the stanchion (alternative holes threaded into stanchion at 90 degrees to facilitate rotation and retained orientation of the reinforcement 40. Depending on the axial length of the critical region (e.g. desired engagement length between reinforcement 40 and stanchion 8) addition axially spaced clamps may be preferred. Such clamps may be placed around the reinforcement at selected axial locations to retain the reinforcement 40 grooves 44 in contact with the raised portions 45 of the stanchions. Clamps and grooves may be used separately or in combination for added shear force transfer.

One embodiment comprises providing an "add on" reinforcement or stiffening element 40 that may be added to (and fixed to) an exterior of a stanchion tube 8 of a fork chassis. In one embodiment the stiffener or reinforcement 40, when in use to enhance fork stiffness, is mounted on the front facing 34 side of the fork and is mounted to the stanchion tubes 8 below the lower triple clamp 7, 30 and above the lower triple clamp 7, 30. Optionally the stanchion 8 can provide mounting provisions for the stiffener 40 to directly bolt/mount to the tube 8, or secondary clamps (not shown) may be used to mount around the reinforcement 40 and stanchion 8 to affix the stiffening element 40 to the front side 34 of the fork. The stiffening element 40 can be produced from a variety of materials, including carbon fiber reinforced composite, injection molded plastic, stamped/formed aluminum, metal matrix composite, work hardened and heat treated brass, steel, titanium, magnesium, or any suitable material or combination thereof. It is noteworthy that reinforcement 40 need not circumvent the stanchion 8 and in fact may only be on the forward 34 side of the stanchion 8 (in other words the reinforcement 40 may be embodied as a "half shell" spanning only 180 degrees of a circumference or less, or more). Such reinforcement 40 would look like the left half of that stiffener 40 as shown in FIG. 4A and may be used in conjunction with a retaining mechanism such as for example axially spaced clamps, or bolts (e.g. bolted directly to the stanchion or slider) along a length of the critical region of desired enhanced stiffness to retain the reinforcement 40. The reinforcement 40 need not traverse the triple clamp 7 and may be only above or below (or both) that clamp 7. In one embodiment the reinforcement 40 is retained at an upper end under the upper triple clamp and at a lower portion under the lower triple clamp. In one embodiment (e.g. a single crown bicycle fork) the reinforcement 40 extends below the crown or single lower fork leg clamp and supports a portion of the fork leg there below. An axially spaced bolt hole pattern may be built into the stanchion on a forward 34 or rear 35 face and on a lateral face 36 such that a bolt on reinforcement may be moved from front to side with a bolt arrangement. Alternatively a front 34 bolt on reinforcement 40 and the reinforcement 40 itself may merely be removed from the fork leg when more fork flexibility is desired. The reinforcement may be located on the stanchion 8 or the slider or both. It may be placed only between the upper and lower triple clamp and in one embodiment does not engage the triple clamps at all. The reinforcement 40 may be used on any of a variety of beam loaded (e.g. beam supported) vehicle suspension members.

In one embodiment, referring to FIG. 5B and 5C, the reinforcement 40 comprises a substantially circular tube 80 having a substantially uniform wall thickness (e.g. no major or minor dimensions) where the wall has a non-uniform modulus (stiffness) distribution circumferentially. Generally, as described herein, non-uniform modulus distribution may result from: 1) dimensional variations; material variations (including local modulus and/or strength characteristics); or 3) suitable combinations of material and dimensional variations. In one embodiment the reinforcement 40 comprises a material or material combination resulting in varying degrees of axial (e.g. lengthwise) bending stiffness at varying locations circumferentially. In one embodiment a carbon fiber filled composite reinforcement 40 comprises a circumferential zone 85 of, for example, approximately 90 degrees (e.g. a quadrant) that is axially reinforced with a higher modulus carbon fiber 90 than the remaining circumferential structure of the reinforcement 40. Such reinforcement results in a zone of high stiffness 85. Such a zone may comprise, for example, 90 degrees, 180 degrees, 45 degrees or any suitable zone angle (or no particular angle per se) for enhancing bending stiffness in a selected zone (and hence orientation). The zone may comprise a continuous reinforcement fiber (e.g. axial 96 or orientated 95), chop random fiber, granular, oriented short, fabric, or any suitable filler for increased structural stiffness. In one embodiment the tube 80 includes a high stiffness zone that comprises a base material having a property of high modulus relative to the base material of the remainder of the tube 80. In one embodiment the tube 80 is made from a material having varying states of stiffness around its circumference. Such varying state stiffness zones may be created for example by selective heat treating. In one embodiment a high strength tube is manufactured having a first stiffness and a zone of that tube is heat treated, using for example localized induction heating, (with a corresponding modulus change such as multiphase brass) leaving a high stiffness zone in the non-annealed area. In one embodiment (not shown) two such high modulus reinforced zones are positioned diametrically opposite one another, for example at 180 degrees apart circumferentially. In one embodiment the reinforcement 40 comprises a suitable combination of selective high modulus construction or reinforcement and a major and minor dimension in cross sectional profile (e.g. non-circular shape plus coincident high stiffness zone. It is noteworthy that the circular cross section reinforcement 40 as described herein would be suitable for use as described herein without any accommodation for non circular cross section in any clamping mechanism. In one embodiment, referring to FIGS. 5B and 5C, a "window" 98 of material is removed or reduced from a wall or walls of the tube 80 corresponding to a zone(s) of reduced stiffness (thereby leaving a zone(s) of high stiffness). Shapes, materials and concepts disclosed herein regarding either stanchions (sliders) or stanchion (slider) reinforcement members are described in reference to one or the other but the reinforcement and stiffness zone creation mechanisms disclosed herein are, for the most part, equally well suited to use directly with a stanchion or slider, or as part of a stanchion or slider reinforcement member.

In one embodiment, the reinforcement is part of the fork leg assembly. Referring to FIGS. 6 and 7, the reinforcement 40 is inside, for example, the stanchion 8. Note that directions 34 and 35 are fore and aft respectively as related to the top views of each FIG. (6A and 7A). In one embodiment (referring to FIGS. 6 and 6A) reinforcement 40 comprises one or more "bars" which engage an inner surface of the stanchion 8 by means of dovetail form slots 210 therein. The reinforcement bars 40 are retained radially (e.g. from falling inward) and rotationally, in selected orientation, by the dovetail slots 210 and retained at a lower end by circumferential shoulder 220 within the stanchion 8. The bars 40 may be retained at an upper end by a top cap (not shown) of the stanchion 8. When one or more bars 40 are in place in a plane residing in the fore 34 / aft 35 direction, they enhance the stiffness of the stanchion along the length in which they are disposed. When more stanchion flexibility is desired, a user may merely remove the reinforcement bar(s) 40.

Referring to FIGS. 7 and 7A, a reinforcement ring 200 comprises reinforcement lobes 40. The ring 200 and its lobes 40 are disposed within the stanchion 8 and are retained axially upon an inner shoulder 220. The reinforcement ring 200 may be axially retained at an upper end by a stanchion top cap (not shown). The reinforcement ring may be rotated within the stanchion to alter the stiffness of the stanchion in the fore 34 / aft 35 direction. The outer surface of the ring 200 and the inner surface of the stanchion 8 may be inter-engagably splined along at least a portion of interface 230 so that the spline engagement (e.g. axially oriented "teeth" such as fine gear teeth) retains selected orientation between the ring 200 and the stanchion 8. In order to change the orientation, the ring 200 may be withdrawn axially upward (following removal of the stanchion top cap for example) until the splines at 200 are no longer engaged. The ring may then be rotated and re-orientated consistent with the indexing of the splines and replaced within the stanchion (the top cap or other retainer may then be replaced).

While embodiments herein have been described in reference to front vehicle suspension and specifically vehicle "forks" it is noted that the concepts hereof including embodiments of reinforcement 40 are suitable for use with other suspension linkages such as rear (e.g. motorcycle, bicycle) swing arms, frame struts and other structural vehicle members where user selectable stiffness is desirable. In many circumstances contemplated herein, the terms fore 34 and aft 35, as used herein, also apply to "up and "down" respectively because the plane, for example 105, that extends front (fore) and back (aft) also extends up and down relative to a vehicle. That is appropriate because vehicle suspension and linkage often operate substantially in the plane perpendicular to the surface being traversed by the vehicle (e.g. up and down) and bending forces encountered by the suspension derive from force components in the "up and down" directions.

While the foregoing is directed to embodiments of the present invention, other and further embodiments of the invention may be devised without departing from the scope thereof, and the scope thereof is determined by the claims that follow.

The invention claimed is:

1. A suspension system for a vehicle comprising:
   a first and second stanchion, each for receiving a corresponding, telescoping slider, wherein an outer surface of each stanchion is non-circular;
   a first clamp with a clamping member for each stanchion, the clamp constructed and arranged to retain the stanchions in a substantially parallel relationship to each other when clamped; and
   at least one shim between the outer surface of each stanchion and an inner surface of each clamping member, the shim constructed and arranged to adopt a circular clamping surface of the clamp to the non-circular outer surface of the stanchion,
   wherein, when the clamp is unclamped, the stanchions are selectively rotatable within the clamp to orient the non-circular surfaces of the stanchions in a predetermined orientation relative to the vehicle.

2. The suspension system of claim 1, wherein the clamp further includes a steering tube mounting interface structure to keep a steering tube in a substantial parallel relationship to the stanchions.

3. The system of claim 1, further including a second clamp for clamping the stanchions at a second location along a length of the stanchions.

4. The system of claim 1, wherein the non-circular stanchions have a major dimension and a minor dimension.

5. The system of claim 4, wherein the non-circular stanchions are elliptically shaped.

6. A suspension assembly comprising:
   a fork leg assembly including a reinforcement portion, the fork leg assembly having a non-uniform cross section comprising a first structural stiffness zone and a second structural stiffness zone;
   a clamp, surrounding the fork leg assembly, and having a clamped position and an unclamped position,
   wherein the reinforcement portion is movable relative to an axis of the suspension assembly, and
   the reinforcement portion being at least one of: axially fixable along an inner surface of the fork leg assembly; axially fixable along an outer surface of the fork leg assembly; and integral with a fork leg of the fork leg assembly.

7. The suspension assembly of claim 6, wherein each reinforcement portion has at least one circumferential zone having a non-uniform modulus distribution, the non-uniform modulus resulting in at least two different bending stiffnesses around a circumference of the reinforcement portion in the circumferential zone, and
   wherein when the clamp is unclamped, the reinforcement portions are selectively rotatable within the clamp to orient the different bending stiffness relative to the vehicle.

8. The suspension system of claim 7, wherein the non-uniform modulus is enhanced at least in part by dimensional variations.

9. The suspension system of claim 7, wherein the non-uniform modulus is due at least in part to material variations.

10. The suspension system of claim 7, wherein the non-uniform modulus is contained in a reinforcement member constructed and arranged to fit in a substantially annular relationship over an outer surface of the stanchion.

11. The suspension assembly of claim 6, wherein the non-uniform cross section is non-circular comprising a major dimension corresponding to the first structural stiffness zone and a minor dimension corresponding to the second structural stiffness zone.

12. The suspension assembly of claim 6, wherein the first structural stiffness zone comprises a first modulus material and the second structural stiffness zone comprises a second modulus material.

* * * * *